(12) United States Patent
Ogumi et al.

(10) Patent No.: US 9,297,934 B2
(45) Date of Patent: Mar. 29, 2016

(54) OPTICAL FILM, POLARIZING PLATE, LIQUID CRYSTAL PANEL, AND IMAGE DISPLAY APPARATUS

(71) Applicant: DAI NIPPON PRINTING CO., LTD., Tokyo (JP)

(72) Inventors: Syouichirou Ogumi, Tokyo (JP); Junya Eguchi, Tokyo (JP); Gen Furui, Tokyo (JP); Seika Minakoshi, Tokyo (JP); Yukimitsu Iwata, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 230 days.

(21) Appl. No.: 13/793,170

(22) Filed: Mar. 11, 2013

(65) Prior Publication Data

US 2013/0242397 A1    Sep. 19, 2013

(30) Foreign Application Priority Data

Mar. 15, 2012    (JP) ................... 2012-059176

(51) Int. Cl.
    *G02B 1/11*    (2015.01)
    *G02B 5/02*    (2006.01)
    *G02F 1/1335*    (2006.01)

(52) U.S. Cl.
    CPC ............... *G02B 1/11* (2013.01); *G02B 5/0221* (2013.01); *G02B 5/0294* (2013.01); *G02F 1/133504* (2013.01)

(58) Field of Classification Search
    CPC ............. G02B 1/11; G02B 1/12; G02B 1/10; G02B 1/105; G02B 1/118
    USPC .................. 359/577, 580, 582, 586, 588–590, 359/483.01, 489.01, 489.07, 489.08, 359/489.11, 599, 601; 362/19; 353/20; 349/96; 428/323, 325, 327, 156, 167, 428/172, 220
    See application file for complete search history.

(56) References Cited

U.S. PATENT DOCUMENTS

2006/0269733 A1    11/2006    Mizuno et al.
2009/0142562 A1*    6/2009    Miyagawa et al. ........... 428/212
(Continued)

FOREIGN PATENT DOCUMENTS

CN    101268389 A    9/2008
JP    2003-131007 A1    5/2003
(Continued)

OTHER PUBLICATIONS

Chinese Office Action (Application No. 201310083883.2) dated Apr. 3, 2015 (with English translation).
(Continued)

*Primary Examiner* — Bumsuk Won
*Assistant Examiner* — Wen Huang
(74) *Attorney, Agent, or Firm* — Burr & Brown, PLLC

(57) ABSTRACT

An optical film, a polarizing plate, a liquid crystal panel, and an image display apparatus are provided, wherein interference fringes can be made to be invisible, and cloudiness can be reduced. In accordance with one aspect of the present invention, an optical film is provided, including a light transmissive substrate, and a functional layer disposed on the light transmissive substrate, wherein the functional layer has a concavo-convex surface forming a surface of the optical film. Assuming that a slope angle of the concavo-convex surface with respect to a film plane of the optical film in a cross section along a direction normal to the film plane is a surface angle, a percentage of a region in which the surface angle is 0.05° or more is 50 % or more in the concavo-convex surface, and the root mean square slope $R\Delta q$ of a roughness curve on the concavo-convex surface is 0.003 or less.

14 Claims, 3 Drawing Sheets

(56) References Cited

U.S. PATENT DOCUMENTS

2010/0027124 A1* 2/2010 Nagahama et al. ........... 359/599
2010/0079869 A1* 4/2010 Inoue et al. .................. 359/586
2011/0194055 A1* 8/2011 Kodama et al. .............. 349/112

FOREIGN PATENT DOCUMENTS

| JP | 2005-099778 A1 | 4/2005 |
| JP | 2011-081118 A1 | 4/2011 |
| JP | 2011-253106 A1 | 12/2011 |

OTHER PUBLICATIONS

Japanese Office Action (Application No. 2012-059176) dated Nov. 13, 2015 (with English translation).

* cited by examiner

OPTICAL FILM, POLARIZING PLATE, LIQUID CRYSTAL PANEL, AND IMAGE DISPLAY APPARATUS

CROSS-REFERENCE TO RELATED APPLICATION

This application claims priority to Japanese Patent Application No. 2012-59176 filed on Mar. 15, 2012 and the entire content of Japanese Patent Application No. 2012-59176 is incorporated herein by reference.

BACKGROUND OF THE INVENTION

1. Field of the Invention

The present invention relates to optical films, polarizing plates, liquid crystal panels, and image display apparatuses.

2. Description of the Related Art

An anti-reflection or antiglare film for suppressing glare from extraneous light is generally disposed on an image display surface in an image display apparatus such as a liquid crystal display (LCD), a cathode ray tube display (CRT), a plasma display (PDP), an electroluminescence display (ELD), or a field emission display (FED).

An antireflection film mainly includes a light transmissive substrate; a hard coat layer disposed on the light transmissive substrate; and a low refractive index layer disposed on the hard coat layer. The antireflection film reduces reflected light in itself by countering light reflected on a surface of the low refractive index layer and light reflected an interface between the low refractive index layer and the hard coat layer with each other.

However, such an antireflection film has a problem that a rainbow-colored uneven pattern called an interference fringe is generated by interference of light reflected on an interface between a light transmissive substrate and a hard coat layer and light reflected on an interface between a low refractive index layer and the hard coat layer due to a difference between the refractive indices of the light transmissive substrate and the hard coat layer.

Against such a problem, there has been developed a technology, in which, when a hard coat layer is formed on a light transmissive substrate, the upper part of the light transmissive substrate is permeated by the constituent of a composition for a hard coat layer, a mixture region, in which the constituent of the light transmissive substrate and the constituent of the hard coat layer are mixed, is formed in the vicinity of an interface between the light transmissive substrate and the hard coat layer, and a difference between the refractive indices of the light transmissive substrate and the hard coat layer is reduced by the mixture region to allow prevention of generation of interference fringes (e.g., see Japanese Patent Laid-Open No, 2003-131007).

However, since the surface of the hard coat layer is flat in the antireflection film, the prevention of the generation of the interference fringes requires the formation of the mixture region having a sufficient thickness. Further, when the mixture region having a sufficient thickness is formed, desired hardness may not be obtained in the antireflection film if the thickness of the hard coat layer on the mixture region is not increased, since the mixture region is comparatively soft. Thus, there is a problem that it is necessary to thickly apply the composition for a hard coat layer on the light transmissive substrate, so that a manufacture cost becomes high.

On the other hand, an antiglare film includes a light transmissive substrate; and an antiglare hard coat layer that is disposed on the light transmissive substrate and has concavities and convexities on a surface thereof (e.g., see Japanese Patent Laid-Open No. 2011-81118). According to the antiglare film, extraneous light can be diffusely reflected by the concavities and convexities on the surface of the antiglare hard coat layer.

In the antiglare film, since interference fringes can be made to be invisible by the concavities and convexities on the surface of the antiglare hard coat layer, the thickness of a mixture region or the antiglare hard coat layer can be made to be smaller than that of the mixture region or hard coat layer of the antireflection film.

Currently, the need for an optical film having surface glossiness, such as the antireflection film, has been increased. However, the antireflection film has the problem that the manufacture cost thereof is high as described above. Further, the antiglare film has cloudiness since such concavities and convexities that antiglare properties are obtained are formed on the surface thereof. Therefore, surface glossiness is not obtained, so that the antiglare film has not been currently a substitute for the antireflection film.

The present invention was accomplished to solve the above-described problems. That is, the present invention is aimed at providing an optical film, a polarizing plate, a liquid crystal panel, and an image display apparatus, wherein interference fringes can be made to be invisible, cloudiness can be reduced, and a manufacture cost can be reduced.

SUMMARY OF THE INVENTION

In accordance with one aspect of the present invention, there is provided an optical film including a light transmissive substrate; and a functional layer disposed on the light transmissive substrate, wherein the functional layer has a concavo-convex surface forming a surface of the optical film; and, assuming that a slope angle of the concavo-convex surface with respect to a film plane of the optical film in a cross section along a direction normal to the film plane is a surface angle, a percentage of a region in which the surface angle is 0.05° or more is 50% or more in the concavo-convex surface.

In accordance with another aspect of the present invention, there is provided a polarizing plate including the optical film described above; and a polarizing element formed on a surface opposite to a surface, on which the functional layer is formed, of the light transmissive substrate of the optical film.

In accordance with another aspect of the present invention, there is provided a liquid-crystal display panel including the optical film described above or the polarizing plate described above.

In accordance with another aspect of the present invention, there is provided an image display apparatus including the optical film described above or the polarizing plate described above.

In the optical film according to one aspect of the present invention and the polarizing plate, the liquid crystal panel, and the image display apparatus according to other aspects, interference fringes can be made to be invisible, cloudiness can be reduced, and a manufacture cost can be reduced since the percentage of the region with a surface angle of 0.05° or more is 50% or more in the concavo-convex surface of the functional layer and the root mean square slope $R\Delta q$ of a roughness curve is 0.003 or less.

DETAILED DESCRIPTION OF THE INVENTION (First Embodiment)

Figure 1:
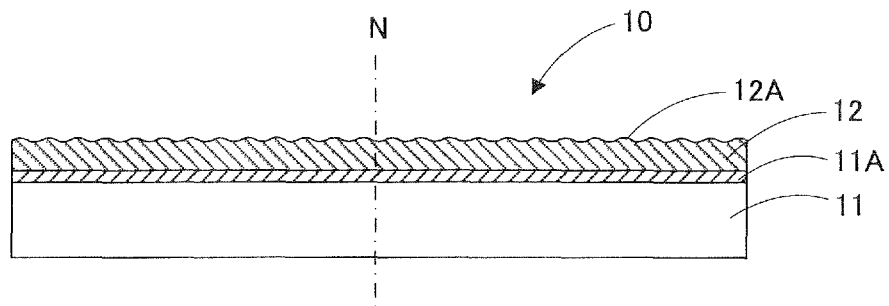
FIG. 1 is a schematic view illustrating the configuration of an optical film according to a first embodiment.
Figure 2:
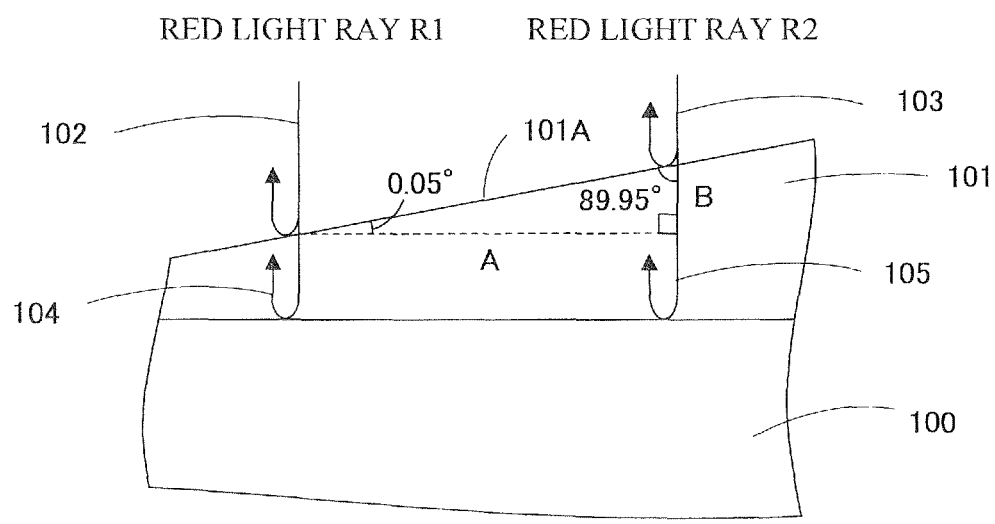
FIG. 2 is a view for describing the degree of a pitch at which red light rays are generated when the surface angle of a concavo-convex surface is 0.05° or more.

An optical film according to the first embodiment of the present invention will be described below with reference to the drawings. FIG. 1 is a schematic view illustrating the configuration of the optical film according to the present embodiment; and FIG. 2 is a view for describing the degree of a pitch at which red light rays are generated when the surface angle of a concavo-convex surface is 0.05° or more.

<<Optical Film>>

As illustrated in FIG. 1, the optical film 10 includes at least a light transmissive substrate 11 and a functional layer 12 disposed on the light transmissive substrate 11. It is preferable to form a mixture region 11A, in which the light transmissive substrate 11 is mixed with the constituent of the binder resin, described below, of the functional layer 12, in the vicinity of the interface between the light transmissive substrate 11 and the functional layer 12, as illustrated in FIG. 1. As used herein, the terms "sheet", "film", "plate", and the like are based only on differences in names and not distinguished from each other. Thus, for example, "sheet" is a concept encompassing a member that can also be called a film or a plate. As one specific example, "optical film" also encompasses a member called "optical sheet", "optics plate", or the like.

<Light Transmissive Substrate>

The light transmissive substrate 11 is not particularly limited as long as the substrate has light transmissiveness but examples thereof include cellulose acylate substrates, cycloolefin polymer substrates, polycarbonate substrates, acrylate-based polymer substrates, polyester substrates, or glass substrates.

Examples of the cellulose acylate substrates include cellulose triacetate substrates and cellulose diacetate substrates. Examples of the cycloolefin polymer substrates include substrates including polymers of norbornene-based monomers, monocyclic cycloolefin monomers, and the like.

Examples of the polycarbonate substrates include aromatic polycarbonate substrates based on bisphenols (such as bisphenol A) and aliphatic polycarbonate substrates based on diethylene glycol bis(allyl carbonate) and the like.

Examples of the acrylate-based polymer substrates include poly(methyl(meth)acrylate) substrates, poly(ethyl(meth)acrylate) substrates, methyl(meth)acrylate-butyl(meth)acrylate copolymer substrates, and the like.

Examples of the polyester substrates include a substrate containing as a constituent at least one of polyethylene terephthalate, polypropylene terephthalate, polybutylene terephthalate, and polyethylene naphthalate; and the like.

Examples of the glass substrates include glass substrates based on soda lime silica glass, borosilicate glass, alkali-free glass, and the like.

The cellulose acylate substrates are preferred among them because of having excellent light transmissiveness and triacetylcellulose substrates (TAC substrates) are further preferred among the cellulose acylate substrates. Such a triacetylcellulose substrate is a light transmissive substrate that can have an average light transmittance of 50% or more in a visible light region of 380 to 780 nm. The triacetylcellulose substrate preferably has an average light transmittance of 70% or more, further preferably 85% or more.

The triacetylcellulose substrate may also be a substance, in which a constituent other than acetic acid is also combined as a fatty acid with which cellulose is esterified, such as cellulose acetate propionate or cellulose acetate butyrate, other than pure triacetylcellulose. Further, other cellulose lower fatty acid esters such as diacetyl cellulose or various additives such as plasticizers, ultraviolet absorbing agents, and lubricants may also be optionally added to such triacetylcelluloses.

The thickness of the light transmissive substrate 11 is not particularly limited but is typically around 20 to 1000 μm and more preferably 25 to 80 μm in consideration of durability, handleability, and/or the like.

<Mixture Region>

The thickness of the mixture region 11A is preferably 0.01 μm or more and 1 μm or less. In accordance with this embodiment, interference fringes can be sufficiently made to be invisible by the concavo-convex surface 12A, described below, of the functional layer 12. Therefore, interference fringes can be made to be invisible even when the thickness of the mixture region 11A is small in such a case. Since the thickness of a mixture region formed with a conventional antireflection film is 3 μm or more, the thickness of the mixture region 11A may be considered to be sufficiently small in comparison with that of the mixture region formed with the conventional antireflection film. Further, the formation of the mixture region 11A can cause adhesiveness between the light transmissive substrate 11 and the functional layer 12 to be more improved. Since interference fringes can be sufficiently made to be invisible by the concavo-convex surface 12A of the functional layer 12 as described above, it is not necessary to form such a mixture region 11A on the optical film 10. Since interference fringes can be made to be invisible even when any mixture region is not formed as described above, for example, even a substrate, on which it is difficult to form a mixture region, such as a cycloolefin substrate or a polyester substrate, may be used as the light transmissive substrate.

<Functional Layer>

A functional layer is a layer intended to exert any function in an optical film and specific examples thereof include layers that exert a function such as a hard coat property, an antireflection property, an antistatic property, or an antifouling property. The functional layer may be not only a single layer but also a layer in which two or more layers are laminated. The functional layer 12 according to the present embodiment functions as a hard coat layer. As used herein, "hard coat layer" refers to a layer for improving the scratch resistance of an optical film and specifically means a layer having a hardness of "H" or more on the pencil hardness test (load of 4.9 N) defined in JIS K5600-5-4 (1999). The functional layer 12 according to the present embodiment is a single layer and functions as a hard coat layer but, for example, a functional layer may also be configured by a hard coat layer and another functional layer disposed between the hard coat layer and a light transmissive substrate. In this case, a surface of an optical film (concavo-convex surface of the functional layer) is a surface of the hard coat layer. Further, a functional layer may also be configured by a first hard coat layer having concavities and convexities on its surface and a second hard coat layer that is disposed on the first hard coat layer and is for adjusting the concavities and convexities on the surface of the first hard coat layer or may also be configured by a hard coat layer having concavities and convexities on its surface and a low refractive index layer that is disposed on the hard coat layer and has a lower refractive index than that of the hard coat layer as described in the second embodiment. In this case, a surface of an optical film (concavo-convex surface of the functional layer) is a surface of the second hard coat layer or the low refractive index layer.

The functional layer 12 has the concavo-convex surface 12A, which forms a surface of the optical film 10. Specifically, assuming that a slope angle of the concavo-convex surface with respect to a film plane of the optical film 10 in a cross section along a direction N normal to the film plane is a surface angle, a region in which the surface angle is 0.05° or more is present at 50% or more in the concavo-convex surface 12A. As used herein, "film plane" should refer to a plane corresponding to the planar direction of an optical film of interest which is viewed as a whole and in perspective. Further, "surface angle" has an absolute value.

The lower limit of the rate of the region in which that surface angle is 0.05° or more is preferably 55% or more, more preferably 60% or more. Further, the upper limit of the percentage of the region in which that surface angle is 0.05° or more is preferably 95% or less, more preferably 90% or less.

The reason why the concavo-convex surface is defined by the percentage of the region in which the surface angle is 0.05° or more is because any interference fringe is not observed in a region having a surface angle of 0.05° or more by the human eye for the following reasons, that is, because interference fringes can be made to be invisible. However, the present invention is not bound by the following theory.

As illustrated in FIG. 2, for example, assuming that, in a region 101A in which a surface angle is 0.05° on a surface of a hard coat layer 101 formed on a light transmissive substrate 100, red light beams 102 and 103 reflected on a surface of the region 101A and red light beams 104 and 105 reflected on the interface between the region 101A and the light transmissive substrate 100 interfere with each other to intensify each other to generate red light rays R1 and R2 (hereinafter, red light ray is referred to as "red ray"), the spacing between the red rays R1 and R2 next to each other is a distance A. As described below, the distance A is determined from a triangle of which the base is the distance A and the height is a distance B as illustrated in FIG. 2.

First, in the triangle, the following expression (1) holds:

$$B/A = \tan 0.05° = 0.00087 \quad (1)$$

The distance B in the expression (1) is not an optical path length but an actual distance.

Further, assuming that an optical path difference between the red light beam 104 and the red light beam 105 is b and the refractive index of the hard coat layer 101 is n, the distance B can be represented by the following expression (2):

$$B = b/2n \quad (2)$$

Since the red ray R1 and the red ray R2 are next to each other and, moreover, the red light beam 104 and red light beam 105 interfere with the red light beam 102 and the red light beam 103, respectively, to intensify each other, assuming that one wavelength of red light is 780 nm, the optical path difference b is one wavelength of red light, i.e., 780 nm. Further, since a hard coat layer typically has a refractive index of around 1.5, assuming that the refractive index n is 1.5, the distance B is determined to be 260 nm from the expression (2).

In addition, when the distance A is calculated by substituting 260 nm into B in the expression (1), the distance A becomes 299 μm.

Thus, when red rays are generated in a region with a surface angle of 0.05°, the red rays are generated at a pitch of 299 μm. Further, since blue or green light has a shorter wavelength than that of red light, blue or green light rays are considered to be generated at a pitch of shorter than 299 μm in a region with a surface angle of 0.05°.

On the other hand, when light and shade change in rectangular form, a human can detect light and shade fringes at a pitch of about 70 μm in the case of a distance of distinct vision of 25 cm since the resolution of the human eye with an eyesight of 1 is one minute. However, when light and shade change not in rectangular form but in gradation form, possible sensitivity in detection by a human is known to decrease even several- to several-tens-fold. Interference fringes change in gradation form. Therefore, even when interference fringes (rays) have a pitch of 300 μm, the interference fringes are considered to be unrecognizable by the human eye. Thus, the human eye cannot recognize any interference fringes of blue or green light because of being incapable of recognizing a red light ray having the longest pitch. As a result, a surface angle of 0.05° or more may be considered to be an angle at which any interference fringes are not recognized by the human eye.

A surface angle is obtained by measuring the surface geometry of the concavo-convex surface of a functional layer. Examples of surface geometry measuring apparatuses include contact-type surface roughness measuring instruments and non-contact-type surface roughness measuring instruments (e.g., interference microscopes, confocal microscopes, and atomic force microscopes, and the like). Among them, an interference microscope is preferred in view of simpleness of measurement. Examples of such interference microscopes include "New View" series, manufactured by Zygo Corporation; and the like.

In order to calculate the percentage of a region with a surface angle of 0.05° or more using an interference microscope, for example, a slope Δi at each point is determined over the whole concavo-convex surface, the slope Δi is converted into a surface angle $θ_i$ from the following expression (3), and the percentage of a region in which the absolute value of the surface angle $θ_i$ is 0.05° or more is thus calculated. The slope Δi can be determined from the following expression (5) because of being the same as a local slope $dZ_i/dX_i$ calculated from the following expression (5).

$$θ_i = \tan^{-1} Δi \quad (3)$$

In measurement of the surface geometry of a concavo-convex surface, it is preferable to calculate a surface angle from the concavo-convex geometry, in which waviness components are removed by a high-pass filter with a cutoff value of 300 μm, since it is necessary to form concavities and convexities in a range of not more than the resolution of the human eye.

Determination of a surface angle is known to be greatly affected by the influence of a sampling interval. In accordance with the present invention, the sampling interval is preferably 1 μm or more and 4 μm or less. This is because an excessively short sampling interval might result in reception of high-frequency components of concavities and convexities on noises to estimate a surface angle to be excessively large while an excessively long sampling interval might result in the impossibility of precise estimation of a surface angle. A wider measurement area is preferable and the measurement is preferably carried out in a region of at least 500 μm×500 μm or larger, more preferably 2 mm×2 mm or larger.

Further, the root mean square slope RΔq of a roughness curve is 0.003 or less on the concavo-convex surface 12A of the functional layer 12. The root mean square slope RΔq of a roughness curve is defined as a root mean square of a local area slope $dZ_i/dX_i$ in JIS-B0601: 2001 and is represented by the following expression (4):

[Expression 1]

$$R\Delta q = \sqrt{\frac{1}{n}\sum_i^n (dZ_i/dX_i)^2} \quad (4)$$

In the expression, n is the total number of measurement points; and $dZ_i/dX_i$ is an i-th local area slope. A local area slope at each point on a measurement plane is determined from, e.g., the following expression (5).

[Expression 2]

$$dZ_i/dX_i = \frac{Z_{i+1} - Z_{i-1}}{2\Delta X} \quad (5)$$

In the expression, assuming that one direction of a measurement plane is an X-direction, $X_i$ is a position in the i-th X-direction, $Z_i$ is the i-th height, and ΔX is a sampling interval.

The lower limit of RΔq is preferably 0.0005 or more, more preferably 0.001 or more. Further, the upper limit of RΔq is preferably 0.0025 or less, more preferably 0.002 or less.

The reason why the concavo-convex surface 12A is defined by RΔq is because the cloudiness of the optical film 10 can be evaluated by using RΔq. That is, since RΔq is the average value of slopes in a micro region, when a steep slope is contained in a component constituting the surface, surface scattering is increased, and, therefore, cloudiness is increased to result in loss of surface glossiness. While there is an average slope angle θa as a parameter representing the surface geometry of a concavo-convex surface, similar to RΔq, a larger-angle component is emphasized in RΔq, which is an average root-mean-square of slopes in a micro region. Accordingly, RΔq is considered to be more sensitive to cloudiness than θa.

A root mean square slope RΔq is obtained by measuring the surface geometry of the concavo-convex surface 12A in the same manner as in the case of the surface angle. Examples of surface geometry measuring apparatuses include contact-type surface roughness measuring instruments and non-contact-type surface roughness measuring instruments (e.g., interference microscopes, confocal microscopes, and atomic force microscopes, and the like). Among them, an interference microscope is preferred in view of simpleness of measurement. Examples of such interference microscopes include "New View" series, manufactured by Zygo Corporation; and the like.

In the concavo-convex surface 12A of the functional layer 12, the average spacing Sm of the concavities and convexities that constitute the concavo-convex surface 12A is preferably 0.20 mm or more and 0.60 mm or less, more preferably 0.22 mm or more and 0.50 mm or less. In the concavo-convex surface 12A of the functional layer 12, the average slope angle θa of the concavities and convexities that constitute the concavo-convex surface 12A is preferably 0.01° or more and 0.1° or less, more preferably 0.04° or more and 0.08° or less.

In the concavo-convex surface 12A of the functional layer 12, the arithmetic mean roughness Ra of the concavities and convexities that constitute the concavo-convex surface 12A is preferably 0.02 μm or more and 0.10 μm or less, more preferably 0.04 μm or more and 0.08 μm or less. In the concavo-convex surface 12A of the functional layer 12, the maximum height roughness Ry of the concavities and convexities that constitute the concavo-convex surface 12A is preferably 0.20 μm or more and 0.60 μm or less, more preferably 0.25 μm or more and 0.40 μm or less. In the concavo-convex surface 12A of the functional layer 12, the ten-point average roughness Rz of the concavities and convexities that constitute the concavo-convex surface 12A is preferably 0.15 μm or more and 0.50 μm or less, more preferably 0.18 μm or more and 0.30 μm or less.

The definitions of "Sm", "Ra", "Ry", and "Rz" described above should comply with JIS B0601-1994. The definition of "θa" should comply with the instruction manual (revised on Jul. 20, 1995) of a surface roughness tester: SE-3400, manufactured by Kosaka Laboratory Ltd. Specifically, θa is represented by the following expression (6):

$$\theta a = \tan^{-1}\Delta a \quad (6)$$

In the expression, Δa is a slope represented in an aspect ratio and a value obtained by dividing the total sum of differences between the minimum portions and the maximum portions of respective concavities and convexities (equivalent to the heights of the respective convexities) by a reference length.

Sm, θa, Ra, Ry, and Rz can be measured, for example, using a surface roughness measuring instrument (model number: SE-3400, manufactured by Kosaka Laboratory Ltd.) under the following measurement conditions:
1) Tracer in Surface Roughness Detector (trade name: SE2555N (standard 2 μm), manufactured by Kosaka Laboratory Ltd.)
   Radius of curvature in tip: 2 μm, apex angle: 90 degrees, material: diamond
2) Measurement Conditions for Surface Roughness Measuring Instrument
   Reference length (cutoff value λc of roughness curve): 2.5 mm
   Evaluation length (reference length (cutoff value λc)×5): 12.5 mm
   Feed speed of tracer: 0.5 mm/sec
   Preliminary length: (cutoff value λc)×2
   Longitudinal magnification: 2000 times
   Lateral magnification: 10 times When the functional layer 12 is a hard coat layer as described in accordance with the present embodiment, the hard coat layer preferably has a thickness of 2.0 μm or more and 7.0 μm or less. When the thickness of the hard coat layer is within this range, desired hardness can be obtained. Further, while the hard coat layer can be thinned, the occurrence of cracking or curl of the hard coat layer can be suppressed. The thickness of the hard coat layer can be measured by microscopic observation of its cross section. The lower limit of the thickness of the hard coat layer is more preferably 3 μm or more and the upper limit thereof is more preferably 5 μm or less.

In accordance with the present invention, when the percentage of a region with a surface angle of 0.05° or more in the concavo-convex surface of a functional layer is 50% or more (requirement 1) and the root mean square slope RΔq of a roughness curve is 0.003 or less (requirement 2), interference fringes can be made to be invisible and cloudiness can be reduced in an optical film, and a manufacture cost can be reduced. Thus, a material that constitutes the functional layer is not particularly limited as long as the material is appropriately selected so that the concavo-convex surface of the functional layer satisfies the above-described requirements 1 and 2. Hereinafter, the concavo-convex surface that satisfies the above-described requirements 1 and 2 is referred to as "specific concavo-convex surface."

The functional layer 12 having the specific concavo-convex surface 12A can be formed by, for example, (1) a method of applying a resin composition for a functional layer, containing fine particles and a photopolymerizable compound to be a binder resin after polymerization, to a light transmissive substrate; (2) a method of applying a composition for a functional layer to a light transmissive substrate and then die-pressing a die, of which the surface is provided with a groove with a geometry reverse to the concavo-convex surface, to the composition for a functional layer; (3) a method of applying a resin composition for a functional layer, in which dislike particles of which the surfaces are provided with a geometry of concavities and convexities corresponding to the above-described specific concavo-convex surface are dispersed, to a transparent substrate to arrange the dislike particles on the surface of the functional layer; or the like. Among them, the method (1) is preferred since production is easy.

In the above-described method (1), when the photopolymerizable compound is polymerized (crosslinked) to become the binder resin, shrinkage as a whole occurs since the photopolymerizable compound effects shrinkage on curing in a portion in which any fine particles are not present. In contrast, only the photopolymerizable compound existing above or below the fine particles effects shrinkage on curing since the fine particles do not effect shrinkage on curing in a portion in which the fine particles are present. As a result, the film thickness of the functional layer in the portion in which the fine particles are present is larger than that in the portion in which any fine particles are not present and, therefore, the surface of the functional layer has a concavo-convex geometry. Thus, the functional layer 12 having the specific concavo-convex surface 12A can be formed by appropriately selecting the kind and particle diameters of the fine particles and the kind of the photopolymerizable compound to adjust film formation conditions.

An example in which a functional layer 12 as a hard coat layer contains fine particles and a binder resin will be described below. For example, such a functional layer 12 containing fine particles and a binder resin can be formed by the above-described method (1).

(Fine Particles)

Although the fine particles may be inorganic fine particles or organic fine particles, among them, the inorganic oxide fine particles such as silica ($SiO_2$) fine particles, alumina fine particles, titania fine particles, tin oxide fine particles, antimony-dope tin oxide (abbreviated name: ATO) fine particles, and zinc oxide fine particles are preferred. The inorganic oxide fine particles can form aggregates in the functional layer and a specific concavo-convex surface 12A can be formed depending on the degree of the aggregation of the aggregates.

Examples of the organic fine particles may include plastic beads. Specific examples of the plastic beads include polystyrene beads, melamine resin beads, acrylic beads, acrylstyrene beads, silicone beads, benzoguanamine beads, benzoguanamine-formaldehyde condensate beads, polycarbonate beads, polyethylene beads, and the like.

In the above-mentioned shrinkage on curing, the organic fine particles preferably have the moderately adjusted resistance to the shrinkage on curing, of the fine particles. In order to adjust the resistance to the shrinkage, it is preferable to previously make a plurality of optical films containing organic fine particles made to have the varying degrees of three-dimensional crosslinking and having different hardnesses and to select the degree of crosslinking suitable for a specific concavo-convex surface by evaluating the concavo-convex surface of the optical film.

In order to use inorganic oxide particles as fine particles, the inorganic oxide particles are preferably subjected to surface treatment. By subjecting the inorganic oxide fine particles to the surface treatment, distribution of the fine particles in a functional layer 12 can be preferably controlled and the chemical resistance and saponification resistance of the fine particles in themselves can also be improved.

As the surface treatment, hydrophobization treatment in which the surfaces of fine particles are imparted with hydrophobicity is preferable. Such hydrophobization treatment can be obtained by chemically reacting the surfaces of fine particles with a surface treatment agent such as a silane or a silazane. Specific examples of the surface treatment agent include dimethyldichlorosilane, silicone oil, hexamethyldisilazane, octylsilane, hexadecylsilane, aminosilane, methacrylsilane, octamethylcyclotetrasiloxane, polydimethylsiloxane, and the like. When the fine particles are inorganic oxide fine particles, hydroxyl groups are present on the surface of the inorganic oxide fine particles. Such hydrophobization treatment as described above results in reduction in the number of hydroxyl groups present on the surfaces of the inorganic oxide fine particles and in the specific surface area of the inorganic oxide fine particles, measured by the BET method, as well as can result in suppression of excessive aggregation of the inorganic oxide fine particles and in formation of a functional layer having a specific concavo-convex surface.

When inorganic oxide particles are used as the fine particle, the inorganic oxide fine particles are preferably amorphous. This is because, when the inorganic oxide particles are crystalline, a Lewis acid salt of the inorganic oxide fine particles becomes stronger due to lattice defects contained in the crystal structure thereof and the excessive aggregation of the inorganic oxide fine particles might not be controlled.

When inorganic oxide particles are used as the fine particles, the inorganic oxide fine particles preferably form aggregates in the functional layer 12. The aggregates of the inorganic oxide fine particles preferably have a structure, in which the inorganic oxide fine particles are three-dimensionally linked, in the functional layer 12. Examples of the structure in which the inorganic oxide fine particles are three-dimensionally linked include basket-shaped and coiled structures. The aggregates having the structure in which the inorganic oxide fine particles are three-dimensionally linked are easily and homogeneously deformed during shrinkage on curing of a photopolymerizable compound to be a binder resin after curing. As a result, a concavo-convex surface can be made to be a very smooth surface, and the concavo-convex surface does not therefore have a steep slope to allow formation of a functional layer having a specific concavo-convex surface. As mentioned above, a functional layer having a specific concavo-convex surface can be formed by moderately adjusting the degree of crosslinking even when organic fine particles are used.

The content of fine particles with respect to the functional layer 12 is not particularly limited but is preferably 0.1 mass % or more and 5.0 mass % or less. Since the content of the fine particles is 0.1 mass % or more, a specific concavo-convex surface can be more surely formed. Further, since the content of the fine particles is 5.0 mass % or less, aggregates are not excessively generated, internal diffusion and/or generation of large concavities and convexities on the surface of the functional layer can be suppressed, and cloudiness can be therefore suppressed. The lower limit of the content of the fine particles is more preferably 0.5 mass % or more while the upper limit of the content of the fine particles is more preferably 3.0 mass % or less.

The fine particles preferably have spherical shapes in a single-particle state. Such a spherical single particle of the fine particles allows an image excellent in contrast when an optical film is placed on the image display surface of an image display apparatus. As used herein, "spherical shape" means those encompassing, e.g., true-spherical shapes, ellipsoidally spherical shapes, and the like, but not encompassing any so-called indefinite shapes.

When inorganic oxide fine particles are used as the fine particles, the inorganic oxide fine particles preferably have an average primary particle diameter of 1 nm or more and 100 nm or less. The average primary particle diameter of the fine particles of 1 nm or more allows easier formation of a functional layer having a specific concavo-convex surface while the average primary particle diameter of 100 nm or less allows the suppression of the diffusion of light due to the fine particles to provide excellent dark room contrast. The lower limit of the average primary particle diameter of the fine particles is more preferably 5 nm or more while the upper limit of the average primary particle diameter of the fine particles is more preferably 50 nm or less. The average primary particle diameter of the fine particles is a value measured using image processing software from an image by a cross-sectional electron microscope (preferably a transmission electron microscope, such as TEM or STEM, with a magnification of 50000 times or more).

When organic fine particles are used as the fine particle, diffusion of light by the fine particles can be suppressed since a refractive index difference between the organic fine particles and a binder resin can be easily reduced to, e.g., less than 0.01, by changing the copolymerization ratio of the resin having a different refractive index. Therefore, the average primary particle diameter may be less than 8.0 µm, preferably 5.0 µm or less.

When inorganic oxide fine particles are used as the fine particles, the average particle diameter of the aggregates of the inorganic oxide fine particles is preferably 100 nm or more and 2.0 µm or less. A specific concavo-convex surface can be easily formed in the case of 100 nm or more while, in the case of 2.0 µm or less, diffusion of light by the aggregates of the fine particles can be suppressed and an image display apparatus with an optical film excellent in dark room contrast can be obtained. The lower and upper limits of the average particle diameter of the aggregates of the fine particles are preferably 200 nm or more and 1.5 µm or less, respectively.

The average particle diameter of the aggregates of inorganic oxide fine particles is obtained by selecting a region of 5 µm in each direction, containing many aggregates of the inorganic oxide fine particles, by observation with a cross-sectional electron microscope (around 10000-20000 times), measuring the particle diameters of the aggregates of the inorganic oxide fine particles in the region, and averaging the particle diameters of the aggregates of the 10 top-ranked inorganic oxide fine particles. The above-described "particle diameter of aggregate of inorganic oxide fine particles", when the cross section of an aggregate of the inorganic oxide fine particles is sandwiched between two arbitrary parallel straight lines, is measured as a distance between the straight lines in such a combination of the two lines that the distance between the two straight lines is maximum. The particle diameter of an aggregate of the inorganic oxide fine particles may also be calculated using image analysis software.

When silica particles are used as the fine particles, fumed silica fine particles are preferred among silica particles from the viewpoint of allowing easy formation of a functional layer having a specific concavo-convex surface. A fumed silica is an amorphous silica that is produced by a dry method and has a particle diameter of 200 nm or less and can be obtained by reacting a volatile compound containing silicon in a vapor phase. Specific examples thereof include a product obtained by hydrolyzing a silicon compound such as silicon tetrachloride ($SiCl_4$) in oxygen and hydrogen flames; and the like. Examples of commercially available products of fumed silica fine particles include AEROSIL R805, manufactured by Nippon Aerosil Co., Ltd.; and the like.

There are fumed silica fine particles which exhibit hydrophilicity and hydrophobicity. Among them, the fumed silica fine particles that exhibit the hydrophobicity are preferred from the viewpoint of the reduced amount of absorbed water and facilitated dispersion in a composition for a functional layer. A hydrophobic fumed silica can be obtained by chemically reacting silanol groups present on the surfaces of the fumed silica fine particles with such a surface treatment agent as described above. The fumed silica is most preferably subjected to octylsilane treatment from the viewpoint of easily obtaining such an aggregate as described above.

Fumed silica fine particles form aggregates. In a composition for a functional layer, the aggregates of the fumed silica fine particles are not dense aggregates but sufficiently non-dense aggregates having shapes such as basket and coiled shapes are formed. Therefore, the aggregates of the fumed silica fine particles are easily and homogeneously deformed during shrinkage on curing of a photopolymerizable compound to be a binder resin after curing. As a result, a functional layer having a specific concavo-convex surface can be formed.

(Binder Resin)

A binder resin is obtained by polymerizing (crosslinking) a photopolymerizable compound by light irradiation. The photopolymerizable compound has at least one photopolymerizable functional group. As used herein, "photopolymerizable functional group" refers to a functional group which can be polymerized by light irradiation. Examples of the photopolymerizable functional group include groups having an ethylenic double bond, such as (meth)acryloyl groups, vinyl groups, and allyl groups. "(Meth)acryloyl groups" means both of "acryloyl group" and "methacryloyl group". Examples of the light that is irradiated when the photopolymerizable compound is polymerized include visible light rays and ionizing radiations such as ultraviolet rays, X-rays, electron rays, α-rays, β-rays, and γ-rays.

Examples of the photopolymerizable compound include photopolymerizable monomers, photopolymerizable oligomers, or photopolymerizable polymers, which may be appropriately adjusted to be used. As the photopolymerizable compound, a combination of a photopolymerizable monomer with a photopolymerizable oligomer or a photopolymerizable polymer is preferred.

Photopolymerizable Monomer

A photopolymerizable monomer has a weight average molecular weight of less than 1000. As the photopolymerizable monomer, a polyfunctional monomer having two (i.e., bifunctional) or more photopolymerizable functional groups is preferred.

Examples of bi- or multi-functional monomers include trimethylolpropane tri(meth)acrylate, tripropylene glycol di(meth)acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth)acrylate, trimethylol propane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerol tetra(meth)acrylate, adamanthyl di(meth)acrylate, isobornyl di(meth)acrylate, dicyclopentane di(meth)acrylate, tricyclodecane di(meth)acrylate, and ditrimethylolpropane tetra(meth)acrylate, and monomers obtained by modifying them with PO, EO, and the like.

Among them, pentaerythritol triacrylate (PETA), dipentaerythritol hexaacrylate (DPHA), pentaerythritol tetraacrylate (PETTA), dipentaerythritol pentaacrylate (DPPA), and the like are preferred from the viewpoint of obtaining a functional layer having high hardness.

Photopolymerizable Oligomer

A photopolymerizable oligomer has a weight average molecular weight of 1000 or more and less than 10000. As such photopolymerizable oligomers, bi- or multi-functional polyfunctional oligomers are preferred. Examples of the polyfunctional oligomers include polyester(meth)acrylates, urethane(meth)acrylates, polyester-urethane(meth)acrylates, polyether(meth)acrylates, polyol(meth)acrylates, melamine(meth)acrylates, isocyanurate(meth)acrylates, epoxy(meth)acrylates, and the like.

Photopolymerizable Polymer

A photopolymerizable polymer has a weight average molecular weight of 10000 or more, and the weight average molecular weight is preferably 10000 or more and 80000 or less, more preferably 10000 or more and 40000 or less. When the weight average molecular weight is more than 80000, coating suitability might be deteriorated due to high viscosity to deteriorate the appearance of an obtained multilayer optical film. Examples of the above-described polyfunctional polymer include urethane(meth)acrylates, isocyanurate(meth)acrylates, polyester-urethane(meth)acrylates, epoxy(meth)acrylates, and the like.

(Other Constituents)

In addition, a solvent drying type resin (such as a thermoplastic resin; such a resin as to become a coating only by drying a solvent added to adjust a solid content during coating) or a thermosetting resin may be optionally added to the functional layer 12.

In the case of adding the solvent drying type resin, any defect in a coating on a surface coated with a coating fluid can be effectively prevented when the functional layer 12 is formed. As the solvent drying type resin, without particular limitation, a thermoplastic resin can be typically used. Examples of the thermoplastic resin may include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers.

Preferably, the thermoplastic resin is noncrystalline and is soluble in an organic solvent (particularly a common solvent in which a plurality of polymers or curable compounds can be dissolved). From the viewpoint of transparency and weather resistance, particularly preferred are styrenic resins, (meth)acrylic resins, alicyclic olefinic resins, polyester resins, cellulose derivatives (such as cellulose esters), and the like.

Examples of the thermosetting resin added to the functional layer 12 may include, but are not particularly limited to, phenol resins, urea resins, diallyl phthalate resins, melamine resins, guanamine resins, unsaturated polyester resins, polyurethane resins, epoxy resins, aminoalkyd resins, melamine-urea cocondensed resins, silicone resins, polysiloxane resins, and the like.

<<Method for Producing Optical Film>>

A method for producing such an optical film 10 as described above will be described in more detail. In the following description, the functional layer 12 is formed by the above-described method (1).

First, a composition for a functional layer is applied onto the surface of the light transmissive substrate 11. Examples of methods for applying a composition for a functional layer include known application methods such as spin coating, dip methods, spray methods, slide coating methods, bar coating methods, roll coating methods, gravure coating methods, and die coating methods.

<Composition for Functional Layer>

A composition for a functional layer contains at least fine particles and a photopolymerizable compound. In addition, the above-described thermoplastic resin, the above-described thermosetting resin, a solvent, or a polymerization initiator may be optionally added to the composition for a functional layer. Further, a dispersing agent, a surfactant, an antistatic agent, a silane coupling agent, a thickener, a coloring inhibitor, a coloring agent (a pigment, a dye), an antifoaming agent, a leveling agent, a flame retardant, an ultraviolet absorbing agent, an adhesion-imparting agent, a polymerization inhibitor, an oxidation inhibitor, a surface modifier, a lubricant, or the like, known in the art, may also be added to the composition for a functional layer depending on a purpose such as increase in the hardness of a functional layer, suppression of shrinkage on curing, or control of a refractive index.

(Solvent)

Examples of the solvent may include alcohols (e.g., methanol, ethanol, propanol, isopropanol, n-butanol, s-butanol, t-butanol, benzyl alcohol, PGME, ethylene glycol), ketones (such as acetone, methyl ethyl ketone (MEK), cyclohexanone, methyl isobutyl ketone, diacetone alcohol, cycloheptanone, and diethyl ketone), ethers (such as 1,4-dioxane, dioxolane, diisopropyl ether, and tetrahydrofuran), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl formate, methyl acetate, ethyl acetate, propyl acetate, butyl acetate, and ethyl lactate), cellosolves (such as methyl cellosolve, ethyl cellosolve, and butyl cellosolve), cellosolve acetates, sulfoxides (such as dimethyl sulfoxide), amides (such as dimethylformamide and dimethylacetamide), and the like, and mixtures thereof.

When the mixture region 11A is formed in the vicinity of the interface between the light transmissive substrate 11 and the functional layer 12 as illustrated in FIG. 1, the solvent used contains a permeable solvent that has high permeability into the light transmissive substrate 11 and dissolves or swells the light transmissive substrate 11. By using the permeable solvent, not only the permeable solvent but also the photopolymerizable compound can permeate the light transmissive substrate 11 and therefore the mixture region 11A in which the light transmissive substrate 11 and the constituent of the binder resin are mixed can be formed in the vicinity of the interface between the light transmissive substrate 11 and the functional layer 12.

Examples of permeable solvents include ketones (acetone, methyl ethyl ketone (MEK), cyclohexanone, methyl isobutyl ketone, diacetone alcohol, cycloheptanone, diethyl ketone), esters (such as methyl formate, methyl acetate, ethyl acetate, propyl acetate, butyl acetate, and ethyl lactate), ethers (such as 1,4-dioxane, dioxolane, diisopropyl ether, and tetrahydrofuran), cellosolves (such as methyl cellosolve, ethyl cellosolve, and butyl cellosolve), cellosolve acetates, sulfoxides (such as dimethyl sulfoxide), phenols (phenol, ortho-chlorophenol), and the like. The solvents may also be mixtures thereof. Among them, as the permeable solvent, at least one selected from the group consisting of, e.g., methyl isobutyl ketone, methyl ethyl ketone, cyclohexanone, methyl acetate, ethyl acetate, propyl acetate, and butyl acetate is preferred when a triacetylcellulose substrate is used as the light transmissive substrate while ortho-chlorophenol is preferred when a polyester substrate is used as the light transmissive substrate.

(Polymerization Initiator)

A polymerization initiator is a constituent that is decomposed by light irradiation, generates a radical, and causes the initiation or progress of the polymerization (crosslinking) of a photopolymerizable compound.

The polymerization initiator is not particularly limited as long as the polymerization initiator can release a substance that initiates radical polymerization by light irradiation. Known polymerization initiators can be used without particular limitation. Specific examples of the polymerization initiators include acetophenones, benzophenones, Michler's benzoyl benzoate, α-amyloxime ester, thioxanthones, propiophenones, benzyls, benzoins, and acylphosphine oxides. Further, it is preferable to mix and use a photosensitizer, and specific examples thereof include n-butylamine, triethylamine, poly-n-butylphosphine, and the like.

As the above-described polymerization initiator, acetophenones, benzophenones, thioxanthones, benzoins, benzoin methyl ether, and the like are preferably used singly or in combination, when the above-described binder resin is a resin system having a radical polymerizable unsaturated group.

The content of the polymerization initiator in the composition for a functional layer is preferably 0.5 part by mass or more and 10.0 parts by mass or less based on 100 parts by mass of the photopolymerizable compound. The content of the polymerization initiator in this range can result in sufficiently kept hard coat performance and the suppression of curing inhibition.

The content (solid content) of a raw material in the composition for a functional layer is not particularly limited but is typically preferably 5 mass % and 70 mass % or less, more preferably 25 mass % or more and 60 mass % or less.

(Leveling Agent)

As a leveling agent, for example, silicone oil, a fluorine-based surfactant, or the like is preferred since a functional layer is prevented from having a Benard cell structure. When a resin composition containing a solvent is applied and dried, e.g., a difference between surface tensions on the outer and inner surfaces of a coating film is generated in the coating film, thereby resulting in a large number of convective flows in the coating film. A structure formed by the convective flows called a Benard cell structure, which causes problems such as orange peel and coating defects in a functional layer to be formed.

In the Benard cell structure, concavities and convexities on the surface of a functional layer might be excessively enlarged. Use of such a leveling agent as mentioned above can prevent the convective flows, and therefore not only provides a functional layer without any defect or unevenness but also facilitates the adjustment of a concavo-convex geometry on the surface of the functional layer.

A method for preparing a composition for a functional layer is not particularly limited as long as each constituent can be homogeneously mixed, and the method can be carried out using a known apparatus such as a paint shaker, a bead mill, a kneader, or a mixer.

A composition for a functional layer is applied to the surface of the light transmissive substrate 11, followed by being transported to a heated zone to dry the coating film-like composition for a functional layer, and drying the composition for a functional layer by any of various known methods to evaporate a solvent. The state of distribution of the aggregates of fine particles can be adjusted by selecting a solvent relative evaporation rate, solid content concentration, coating liquid temperature, drying temperature, a drying wind velocity, drying time, solvent atmosphere concentration in a drying zone, and the like.

Particularly, the methods of adjusting the state of the distribution of the aggregates of fine particles by selecting drying conditions are simple and preferable. A specific drying temperature of 30 to 120° C. and a drying wind velocity of 0.2 to 50 m/s are preferred. The state of the distribution of the aggregates of the fine particles can be adjusted to a desired state by performing dry treatment, appropriately adjusted in this range, once or several times.

By drying the composition for a functional layer, the photopolymerizable compound remains in the light transmissive substrate although the permeable solvent that permeates the light transmissive substrate is evaporated.

Then, by irradiating the coating film-like composition for a functional layer with light such as ultraviolet light to polymerize (crosslink) the photopolymerizable compound, the composition for a functional layer is cured to form the functional layer 12 and to form the mixture region 11A When ultraviolet light is used as light for curing a composition for a functional layer, there can be used ultraviolet light emitted from ultra-high-pressure mercury lamps, high-pressure mercury lamps, low-pressure mercury lamps, carbon-arc, xenon-arc and metal halide lamps, and the like. Further, a wavelength region of 190 to 380 nm may be used for the wavelength of the ultraviolet light. Specific examples of electron beam sources include various electron beam accelerators such as Cockcroft-Walton accelerators, Van de Graaff accelerators, resonance transformer accelerators, insulated core transformer accelerators, linear accelerators, Dynamitron accelerators, and high-frequency accelerators.

The optical film 10 preferably has a total light transmittance of 85% or more. The total light transmittance of 85% or more can result in more improvement in color reproductivity and visibility when the optical film 10 is put on the surface of the image display apparatus. The total light transmittance of 90% or more is preferred. The total light transmittance can be measured by a method according to JIS K-7361 using a haze meter (Instrument identification: HM-150, manufactured by Murakami Color Research Laboratory).

The optical film 10 preferably has a haze value of less than 1%. The haze value of less than 1% can result in desired optical properties and visibility that is more improved when the optical film 10 is placed on an image display surface. The haze value is more preferably 0.5% or less, further preferably 0.3% or less. The haze value can be measured by a method according to JIS K-7136 using a haze meter (Instrument identification: HM-150, manufactured by Murakami Color Research Laboratory).

The optical film 10 preferably has a transmission image sharpness of 75% or more and less than 95% with a comb of 0.125 mm and a transmission image sharpness of 95% or more with a comb of 2.0 mm. The transmission image sharpness of 75% or more with a comb of 0.125 mm can result in more improvement in the sharpness of an image to obtain superior image quality when the image is displayed. Further, the transmission image sharpness of 95% or less can result in more preferable prevention of any interference fringe. The transmission image sharpness with the comb of 0.125 mm is more preferably 80% or more and 90% or less. Further, the transmission image sharpness of 95% or more with the comb of 2.0 mm can result in more improvement in the sharpness of an image and the suppression of cloudiness due to the diffuse reflection of extraneous light. The transmission image sharpness can be measured by a method according to a transmission method for image sharpness in JIS K-7105 using an image clarity measuring device (instrument identification: ICM-1T, manufactured by Suga Test Instruments Co., Ltd.).

The optical film 10 preferably has a contrast ratio of 80% or more, more preferably 90% or more. The contrast ratio of 80% or more can result in excellent dark room contrast and more improved visibility when the optical film 10 is put on the surface of the image display apparatus.

The above-described contrast ratio as used herein is a value measured by the following method. First, two polarizing plates (AMN-3244TP, manufactured by Samsung Electronics Co., Ltd.) are used employing a backlight unit in which a diffuser panel is placed on a cold cathode tube light source, a value ($L_{max}/L_{min}$) obtained by dividing $L_{max}$ of the luminance of light passing when the polarizing plates are placed in a parallel nicol by $L_{min}$ of the luminance of light passing when the polarizing plates are placed in a cross nicol is regarded as a contrast, and a value obtained by dividing the contrast ($L_1$) of the optical film (light transmissive substrate+functional layer, etc.) by the contrast ($L_2$) of the light transmissive substrate, ($L_1/L_2$)×100(%), is determined as the contrast ratio. The luminances are measured in a dark room. The above-described luminances are measured using a color luminance meter (BM-5A, manufactured by Topcon Corporation) with the measurement angle of the color luminance meter set to 1° and a visual field diameter of 5 mm on a sample. Further, a backlight quantity is set so that a luminance at which the two polarizing plates are placed in the parallel nicol in the state in which no sample is placed is 3600 cd/m².

In accordance with the present embodiment, since the percentage of a region with a surface angle of 0.05° or more in the concavo-convex surface 12A of the functional layer 12 is 50% or more and the root mean square slope RΔq of a roughness curve is 0.003 or less, interference fringes can be made to be invisible, cloudiness can be reduced, and a manufacture cost can be reduced. That is, interference fringes can be made to be invisible since the rate of the region with the surface angle of 0.05° or more, in which interference fringes can be made to be invisible (region in which interference fringes can be made to be invisible), is 50% or more in the concavo-convex surface 12A of the functional layer 12. Further, the thickness of the mixture region can be reduced since interference fringes can be made to be invisible by the concavo-convex surface 12A of the functional layer 12. As a result, the thickness of the functional layer can be reduced to reduce the manufacturing costs. Furthermore, cloudiness can be reduced to obtain an optical film having surface glossiness since the root mean square slope RΔq of the roughness curve is 0.003 or less in the concavo-convex surface 12A of the functional layer 12.

In a conventional antireflection film, light other than regular reflection light and regular transmission light has been considered to deteriorate image quality and therefore the presence of diffused light in itself in the antireflection film has been considered to be negative. For example, even if it was necessary to add fine particles, e.g., in order to improve hard coat properties, materials and manufacture conditions have been selected with an eye only toward preventing diffused light from being generated by aggregating the fine particles to have large particle diameters. That is, in order to obtain a sharp image without cloudiness by prevention of the generation of diffused light, a flat surface has been required for the antireflection film and it has not been possibly conceivable that the surface would be formed as a concavo-convex surface because of causing diffused light. However, the present inventor found that light reflected or transmitted from a specific concavo-convex surface in accordance with the present invention is within the range recognized to be equivalent to regular reflection and regular transmission based on the detectability of the human eye even if being diffused light, and a surface is therefore provided with specific on purpose to make interference fringes invisible. In contrast, in a conventional antiglare film, since the prevention of the reflection of an external image is the action in itself of the antiglare film, concavities and convexities present on the surface of the antiglare film are required to surely diffuse an external image reflecting an observer. Therefore, it is necessary that the concavities and convexities present on the surface of the antiglare film are extremely large compared with the concavities and convexities present on the specific surface of the functional layer according to the present invention. Thus, the above-described effects provided by the percentage of the region with a surface angle of 0.05° or more, of 50% or more, in the concavo-convex surface 12A of the functional layer 12 and the root mean square slope RΔq of the roughness curve of 0.003 or less are considered to be remarkable effects beyond an expectable range in light of the technical standards of the conventional antireflection and antiglare films.

<<Polarizing Plate>>

Figure 3:
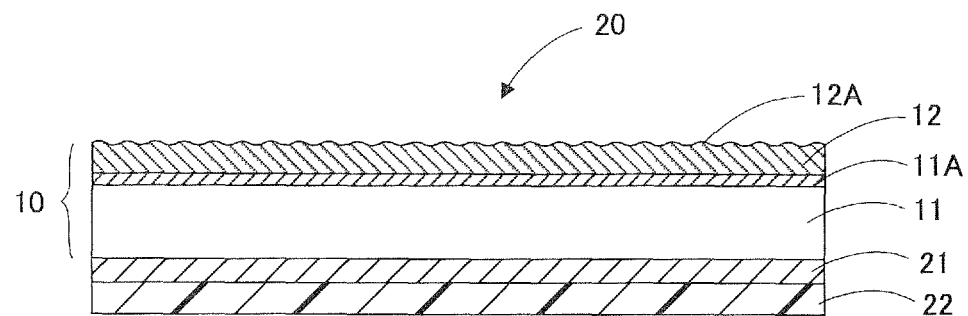
FIG. 3 is a schematic view illustrating the configuration of a polarizing plate according to the first embodiment.

An optical film 10 may be incorporated, for example, into a polarizing plate and be used. FIG. 3 is a schematic view illustrating the configuration of a polarizing plate into which the optical film according to the present embodiment is incorporated. As illustrated in FIG. 3, a polarizing plate 20 includes the optical film 10, a polarizing element 21, and a protective film 22. The polarizing element 21 is formed on a surface of the light transmissive substrate 11 and the surface of the polarizing element 21 is opposite to the other surface thereof on which the functional layer 12 is formed. The protective film 22 is placed on a surface of the polarizing element 21 and the surface of the protective film 22 is opposite to the other surface thereof on which the optical film 10 is placed. The protective film 22 may also be a retardation film.

Examples of the polarizing element 21 include polyvinyl alcohol films, polyvinyl formal films, polyvinyl acetal films, ethylene-vinyl acetate copolymer-based saponified films, and the like, dyed with iodine or the like and stretched. When the optical film 10 and the polarizing element 21 are laminated, it is preferable to previously subject the light transmissive substrate 11 to saponification treatment. Better adhesiveness and an antistatic effect can also be obtained by the saponification treatment.

<<Liquid Crystal Panel>>

Figure 4:
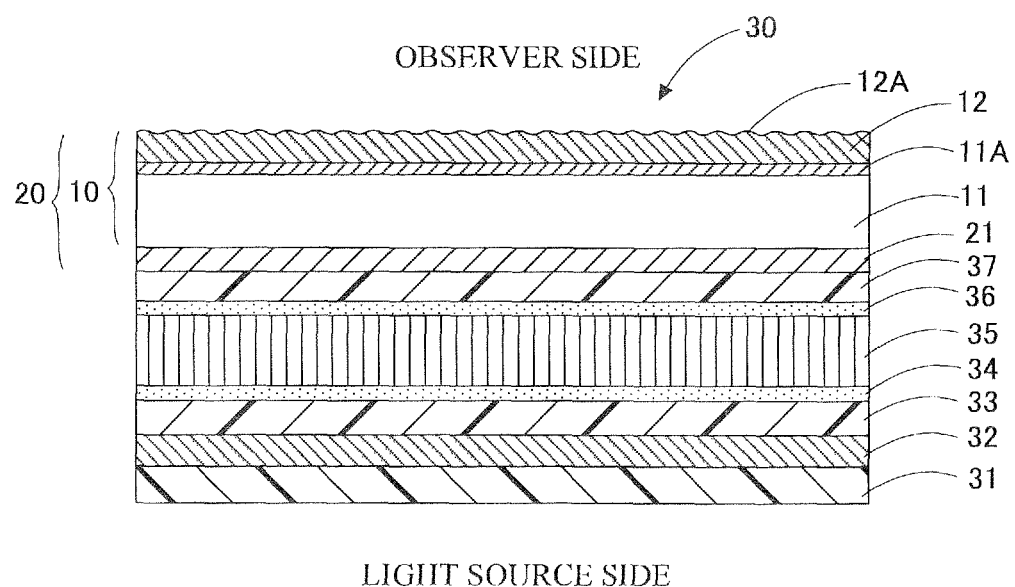
FIG. 4 is a schematic view illustrating the configuration of a liquid crystal panel according to the first embodiment.

An optical film 10 and a polarizing plate 20 may be incorporated into a liquid crystal panel and be used. FIG. 4 is a schematic view illustrating the configuration of a liquid crystal panel into which the optical film according to the present embodiment is incorporated.

The liquid crystal panel illustrated in FIG. 4 has a structure in which a protective film 31 such as a triacetylcellulose film (TAC film), a polarizing element 32, a retardation film 33, an adhesive layer 34, a liquid crystal cell 35, an adhesive layer 36, a retardation film 37, a polarizing element 21, and the optical film 10 are laminated in the order mentioned from a light source side (backlight unit side) to an observer side. In the liquid crystal cell 35, a liquid crystal layer, an oriented film, an electrode layer, a color filter, and the like are placed between two glass substrates.

Examples of the retardation films 33 and 37 include triacetylcellulose films and cycloolefin polymer films. The retardation film 37 may also be the same as the protective film 22. Examples of adhesives constituting the adhesive layers 34 and 36 include pressure-sensitive adhesives (PSAs).

<<Image Display Apparatus>>

Figure 5:
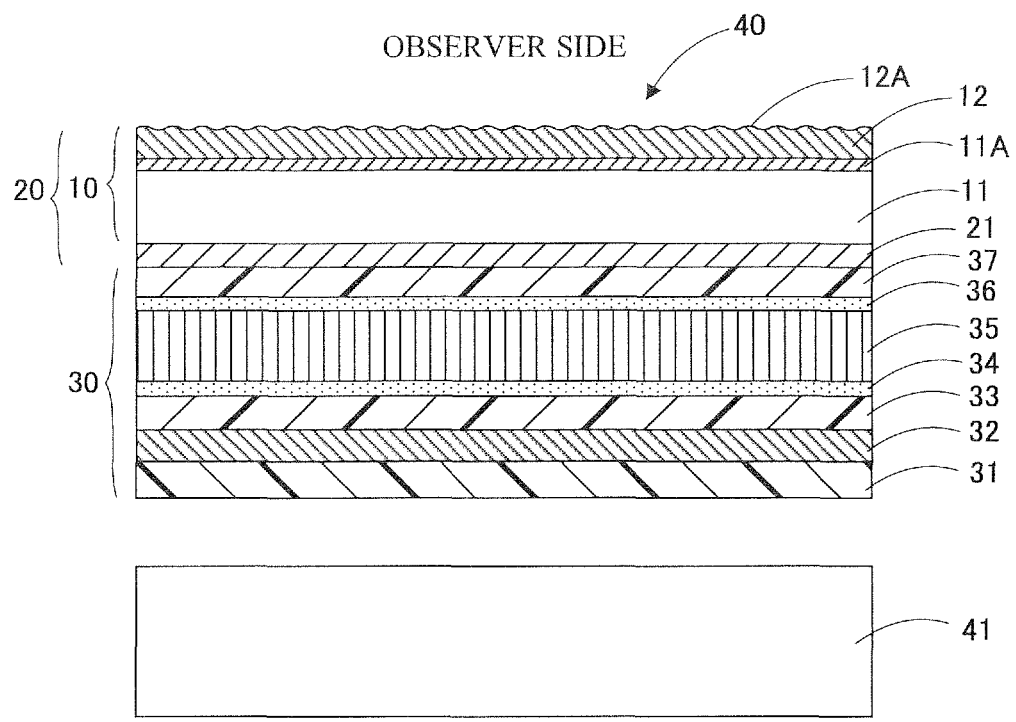
FIG. 5 is a schematic view illustrating the configuration of a liquid crystal display which is an example of an image display apparatus according to the first embodiment.

An optical film 10, a polarizing plate 20, and a liquid crystal panel 30 may be incorporated into an image display apparatus and be used. Examples of the image display apparatus include liquid crystal displays (LCDs), cathode ray tube displays (CRTs), plasma displays (PDPs), electroluminescence displays (ELDs), field emission displays (FEDs), touch panels, tablet PCs, electronic papers, and the like. FIG. 5 is a schematic view illustrating the configuration of a liquid crystal display which is an example of the image display apparatus into which the optical film according to the present embodiment is incorporated.

An image display apparatus 40 illustrated in FIG. 5 is a liquid crystal display. The image display apparatus 40 is configured by a backlight unit 41; and the liquid crystal panel 30 including the optical film 10 placed in a side closer to an observer side than the backlight unit 41. As the backlight unit 41, a known backlight unit can be used.

(Second Embodiment)

Figure 6:
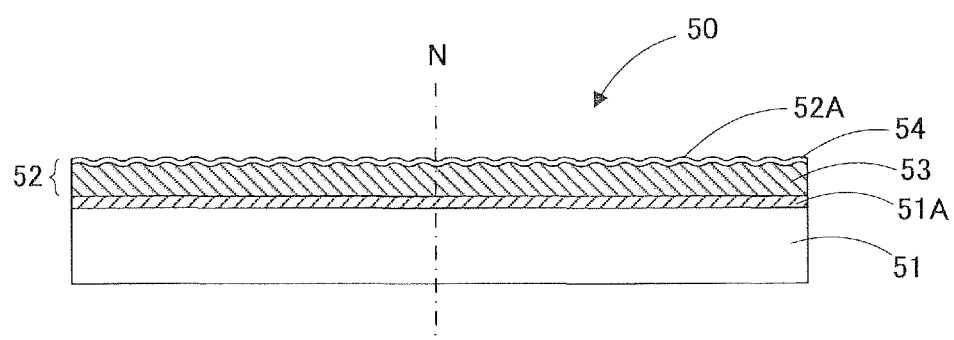
FIG. 6 is a schematic view illustrating the configuration of an optical film according to a second embodiment.

An optical film according to the second embodiment of the present invention will be described below with reference to the drawings. FIG. 6 is a schematic view illustrating the configuration of the optical film according to the present embodiment.

<<Optical Film>>

As illustrated in FIG. 6, an optical film 50 includes at least a light transmissive substrate 51 and a functional layer 52 disposed on the light transmissive substrate 51. The description of the light transmissive substrate 51 is omitted in this embodiment since the light transmissive substrate 51 is similar to the light transmissive substrate 11 described in the first embodiment. In the vicinity of the interface between the light transmissive substrate 51 and the functional layer 52 (in the vicinity of the interface between the light transmissive substrate 51 and a hard coat layer 53 described below), it is preferable to form a mixture region 51A in which the light transmissive substrate 52 and the constituent of the binder resin of the hard coat layer 53 are mixed as illustrated in FIG. 5.

(Functional Layer)

In the present embodiment, the functional layer 52 is configured by the hard coat layer 53 and a low refractive index layer 54 disposed in on the hard coat layer 53. The functional layer 52 has a concavo-convex surface 52A, which forms a surface of the optical film 50, and the concavo-convex surface 52A of the functional layer 52 is a surface of the low refractive index layer 54.

As in the case of the concavo-convex surface 12A of the functional layer 12, assuming that a slope angle of the surface with concavities and convexities with respect to a film plane in a cross section along a direction N normal to the film plane of the optical film 50 is a surface angle, a percentage of a region in which the surface angle is 0.05° or more is 50% or more in the concavo-convex surface 52A of the functional layer 52 (surface of refractive index layer 54).

The lower limit of the percentage of the region in which the surface angle is 0.05° or more in the concavo-convex surface 52A of the functional layer 52 is preferably 55% or more, more preferably 60% or more. Further, the upper limit of the percentage of the region in which the surface angle is 0.05° or more is preferably 95% or less, more preferably 90% or less.

As in the case of the concavo-convex surface 12A of the functional layer 12, the root mean square slope RΔq of a roughness curve is 0.003 or less in the concavo-convex surface 52A of the functional layer 52. The lower limit of RΔq is preferably 0.0005 or more, more preferably 0.001 or more. Further, the upper limit of RΔq is preferably 0.0025% or less, more preferably 0.002% or less.

(Hard Coat Layer)

The description of the hard coat layer 53 is omitted in the present embodiment since the hard coat layer 53 is similar to the functional layer 12 described in the first embodiment. However, unlike the functional layer 12, in the surface of the hard coat layer 53, it is not necessary that a region with a surface angle of 0.05° or more is 50% or more and the root mean square slope RΔq of a roughness curve is 0.003 or less.

(Low Refractive Index Layer)

The low refractive index layer 54 is intended to reduce the reflectance of light from the outside (e.g., fluorescent lamp, natural light, etc.), reflected on the surface of the optical film 50. The low refractive index layer 54 has a refractive index that is lower than that of the hard coat layer 53. Specifically, for example, the low refractive index layer preferably has a refractive index of 1.45 or less, more preferably a refractive index of 1.42 or less.

The thickness of the low refractive index layer 54 is not particularly limited but may be typically appropriately set within the range of around 30 nm to 1 μm. The thickness $d_A$ (nm) of the low refractive index layer 54 preferably satisfies the following expression (7):

$$d_A = m\lambda/(4n_A) \quad (7)$$

In the above-described expression, $n_A$ represents the refractive index of the low refractive index layer; m represents a positive odd number, preferably 1; and λ is a wavelength, preferably a value in the range of 480 nm or more and 580 nm or less.

From the viewpoint of a lower reflectance, the low refractive index layer 54 preferably satisfies the following expression (8):

$$120 < n_A d_A < 145 \quad (8)$$

As for the low refractive index layer, the single layer provides an effect while two or more low refractive index layers can be appropriately placed for the purpose of adjusting a lower minimum reflectance or a higher minimum reflectance. When the two or more low refractive index layers are placed, the refractive indices and thicknesses of the respective low refractive index layers are preferably different.

The low refractive index layer 54 can be preferably constituted by any of 1) a resin containing low refractive index particles of silica, magnesium fluoride, or the like; 2) a fluorinated resin which is a low refractive index resin; 3) a fluorinated resin containing silica or magnesium fluoride; 4) a thin film with a low refractive index substance such as silica or magnesium fluoride; and the like. As a resin except the fluorinated resins, a resin similar to the binder resin constituting the above-mentioned functional layer can be used.

Further, silica is preferably a hollow silica fine particle, and such hollow silica fine particles can be produced, for example, by a production method described in Examples in Japanese Patent Laid-Open No. 2005-099778.

For the fluorinated resins, a polymerizable compound containing at least a fluorine atom in a molecule or a polymer thereof may be used. The polymerizable compound is not particularly limited but preferably has a curing reactive group such as a photopolymerizable functional group or a polar group which is thermally cured. Also, the polymerizable compound may be a compound simultaneously having these reactive groups together. In contrast to the polymerizable compound, the polymer does not have any reactive group as described above.

As such photopolymerizable compounds, a wide variety of fluorine-containing monomers having ethylenically unsaturated bonds may be used. More specifically, examples thereof may include fluoroolefins (such as fluoroethylene, vinylidene fluoride, tetrafluoroethylene, hexafluoropropylene, perfluorobutadiene, and perfluoro-2,2-dimethyl-1,3-dioxole). As (meth)acryloyloxy group-containing compounds, there may also be mentioned (meth)acrylate compounds with fluorine atoms in a molecule, such as 2,2,2-trifluoroethyl(meth)acrylate, 2,2,3,3,3-pentafluoropropyl(meth)acrylate, 2-(perfluorobutyl)ethyl(meth)acrylate, 2-(perfluorohexyl)ethyl(meth)acrylate, 2-(perfluorooctyl)ethyl(meth)acrylate, 2-(perfluorodecyl)ethyl(meth)acrylate, α-trifluoromethyl methacrylate, and α-trifluoroethyl methacrylate; fluorine-containing polyfunctional (meth)acrylic acid ester compounds having in a molecule a $C_1$-$C_{14}$ fluoroalkyl, fluorocycloalkyl or fluoroalkylene group with at least three fluorine atoms, and at least two (meth)acryloyloxy groups; and the like.

As examples of the above-described polar group which is thermally cured, there are preferred hydrogen bond-forming groups such as hydroxyl, carboxyl, amino and epoxy groups. These are excellent not only in adhesiveness with coating films but also in affinity with inorganic ultrafine particles such as silica. Examples of polymerizable compounds having thermosetting polar groups include 4-fluoroethylene-perfluoroalkylvinyl ether copolymers; fluoroethylene-hydrocarbon-based vinyl ether copolymers; fluorine-modified products of various resins such as epoxy, polyurethane, cellulose, phenol and polyimide resins; and the like.

Examples of polymerizable compounds having both photopolymerizable functional groups and polar groups which are thermally cured, as described above, may include partially or fully fluorinated alkyl, alkenyl and aryl esters of acrylic or methacrylic acid; fully or partially fluorinated vinyl ethers; fully or partially fluorinated vinyl esters; fully or partially fluorinated vinyl ketones; and the like.

Examples of the fluorinated resins may include: polymers of monomers or monomer mixtures containing at least one fluorine-containing (meth)acrylate compound of the above-described polymerizable compounds with ionizing radiation curable groups; copolymers of at least one of the above-described fluorine-containing (meth)acrylate compounds with a (meth)acrylate compound containing no fluorine atom in a molecule, such as methyl(meth)acrylate, ethyl(meth)acrylate, propyl(meth)acrylate, butyl(meth)acrylate or 2-ethylhexyl(meth)acrylate; fluorine monomer-containing homopolymers or copolymers such as fluoroethylene, vinylidene fluoride, trifluoroethylene, chlorotrifluoroethylene, 3,3,3-trifluoropropylene, 1,1,2-trichloro-3,3,3-trifluoropropylene or hexafluoropropylene; and the like. Silicone-containing vinylidene fluoride copolymers obtained by containing a silicone component in these copolymers may also be used. Examples of silicone components in this case include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenyl methylsilicone, alkyl/aralkyl-modified silicone, fluorosilicone, polyether-modified silicone, fatty acid ester-modified silicone, methylhydrogen silicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone, fluorine-modified silicone, polyether-modified silicone, and the like. Compounds with dimethylsiloxane structures are preferred among the above.

Furthermore, non-polymers or polymers containing such compounds as described below may also be used as the fluorinated resins. That is, there may be used compounds obtained by reacting fluorine-containing compounds having at least one isocyanate group in a molecule with compounds having at least one isocyanate group-reacting functional group such as an amino, hydroxyl or carboxyl group in a molecule; compounds obtained by reacting fluorine-containing polyols such as fluorine-containing polyether polyols, fluorine-containing alkyl polyols, fluorine-containing polyester polyols, and fluorine-containing ε-caprolactone-modified polyols, with isocyanate group-containing compounds; and the like.

Also, such various binder resins as described as well as the above-described polymerizable compounds having fluorine atoms and polymers may be mixed with the above-described functional layer 12 and be used. Furthermore, there may be appropriately used a curing agent for curing a reactive group and/or the like as well as various additives and solvents for improving coating properties and for imparting antifouling properties.

For forming the low refractive index layer 54, the viscosity of a composition for a low refractive index layer obtained by adding the above-mentioned materials is preferably 0.5 to 5 mPa·s (25° C.) at which preferred application properties are obtained, preferably in the range of 0.7 to 3 mPa·s (25° C.). An antireflection layer with excellent visible light rays can be realized, a homogeneous thin film without application unevenness can be formed, and a low refractive index layer which is particularly excellent in adhesiveness can be formed.

Means for curing a composition for a low refractive index layer may be the same as described in the above-mentioned functional layer 12. When heating means is used for curing treatment, a thermal polymerization initiator that generates, e.g., radicals and initiates polymerization of the polymerizable compound by heating is preferably added to the fluorinated resin composition.

In accordance with the present embodiment, since the percentage of a region with a surface angle of 0.05° or more in the surface concavo-convex 52A of the functional layer 52 (surface of low refractive index layer 54) is 50% or more and the root mean square slope RΔq of a roughness curve is 0.003 or less, interference fringes can be made to be invisible, cloudiness can be reduced, and the manufacturing costs can be reduced, as described in the first embodiment.

EXAMPLES

The present invention will be described below with reference to Examples in order to described the present invention in detail but the present invention is not limited to the description thereof.

<Preparation of Composition for Hard Coat Layer>

First, each constituent was blended to obtain a composition for a hard coat layer to have the following composition:
  (Composition 1 for Hard Coat Layer)
  Fumed silica (octylsilane treatment, average particle diameter of 12 nm, manufactured by Nippon Aerosil Co., Ltd.): 1 part by mass
  Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass
Polymerization initiator (IRGACURE 184, manufactured by BASF Japan Ltd.): 5 parts by mass
Polyether-modified silicone (product name: TSF4460, manufactured by Momentive Performance Materials Inc.): 0.025 part by mass
Toluene: 105 parts by mass
Isopropyl alcohol: 30 parts by mass
Cyclohexanone: 15 parts by mass The above-described fumed silica was subjected to octylsilane treatment (treatment of substituting a silanol group on the surface of the fumed silica with an octylsilyl group by octylsilane to perform hydrophobization).

(Composition 2 for Hard Coat Layer)
Fumed silica (octylsilane treatment, average particle diameter of 12 nm, manufactured by Nippon Aerosil Co., Ltd.) 1.5 parts by mass
Pentaerythritol tetraacrylate (PETTA) (product name: PETA, manufactured by Daicel-Cytec Company, Ltd.): 60 parts by mass
Urethane acrylate (product name: UV1700B, manufactured by The Nippon Synthetic Chemical Industry Co., Ltd., weight average molecular weight: 2000, number of functional group: 10): 40 parts by mass
Polymerization initiator (IRGACURE 184, manufactured by BASF Japan Ltd.): 5 parts by mass
Polyether-modified silicone (TSF4460, manufactured by Momentive Performance Materials Inc.): 0.025 part by mass
Toluene: 105 parts by mass
Isopropyl alcohol: 30 parts by mass
Cyclohexanone: 15 parts by mass (Composition 3 for Hard Coat Layer)
Fumed silica (octylsilane treatment, average particle diameter of 12 nm, manufactured by Nippon Aerosil Co., Ltd.): 0.5 part by mass
Pentaerythritol tetraacrylate (PETTA) (product name: PETA, manufactured by Daicel-Cytec Company, Ltd.): 60 parts by mass
Urethane acrylate (product name: UV1700B, manufactured by The Nippon Synthetic Chemical Industry Co., Ltd., weight average molecular weight: 2000, number of functional group: 10): 40 parts by mass
Polymerization initiator (IRGACURE 184, manufactured by BASF Japan Ltd.): 5 parts by mass
Polyether-modified silicone (product name: TSF4460, manufactured by Momentive Performance Materials Inc.): 0.025 part by mass
Toluene: 105 parts by mass
Isopropyl alcohol: 30 parts by mass
Cyclohexanone: 15 parts by mass (Composition 4 for Hard Coat Layer)
Pentaerythritol tetraacrylate (PETTA) (product name: PETA, manufactured by Daicel-Cytec Company, Ltd.): 60 parts by mass
Urethane acrylate (product name: UV1700B, manufactured by The Nippon Synthetic Chemical Industry Co., Ltd., weight average molecular weight: 2000, number of functional group: 10): 40 parts by mass
Polymerization initiator (IRGACURE 184, manufactured by BASF Japan Ltd.): 5 parts by mass
Polyether-modified silicone (TSF4460, manufactured by Momentive Performance Materials Inc.): 0.025 part by mass
Toluene: 105 parts by mass
Isopropyl alcohol: 30 parts by mass
Cyclohexanone: 15 parts by mass (Composition 5 for Hard Coat Layer)
Organic fine particles (hydrophilization-treated acryl-styrene copolymer particles, average particle diameter of 2.0 μm, refractive index of 1.515, manufactured by Sekisui Plastics Co., Ltd.): 3 parts by mass
Fumed silica (methylsilane treatment, average particle diameter of 12 nm, manufactured by Nippon Aerosil Co., Ltd.) 1 part by mass
Pentaerythritol tetraacrylate (PETTA) (product name: PETA, manufactured by Daicel-Cytec Company, Ltd.): 60 parts by mass
Urethane acrylate (product name: UV1700B, manufactured by The Nippon Synthetic Chemical Industry Co., Ltd., weight average molecular weight: 2000, number of functional group: 10): 40 parts by mass
Polymerization initiator (IRGACURE 184, manufactured by BASF Japan Ltd.): 5 parts by mass
Polyether-modified silicone (TSF4460, manufactured by Momentive Performance Materials Inc.): 0.025 part by mass
Toluene: 105 parts by mass
Isopropyl alcohol: 30 parts by mass
Cyclohexanone: 15 parts by mass (Composition 6 for Hard Coat Layer)
Organic fine particles (hydrophilization-treated acryl-styrene copolymer particles, average particle diameter of 2.0 μm, refractive index of 1.55, manufactured by Sekisui Plastics Co., Ltd.): 3 parts by mass
Fumed silica (methylsilane treatment, average particle diameter of 12 nm, manufactured by Nippon Aerosil Co., Ltd.) 1 part by mass
Pentaerythritol tetraacrylate (PETTA) (product name: PETA, manufactured by Daicel-Cytec Company, Ltd.): 60 parts by mass
Urethane acrylate (product name: UV1700B, manufactured by The Nippon Synthetic Chemical Industry Co., Ltd., weight average molecular weight: 2000, number of functional group: 10): 40 parts by mass
Polymerization initiator (IRGACURE 184, manufactured by BASF Japan Ltd.): 5 parts by mass
Polyether-modified silicone (TSF4460, manufactured by Momentive Performance Materials Inc.): 0.025 part by mass
Toluene: 105 parts by mass
Isopropyl alcohol: 30 parts by mass
Cyclohexanone: 15 parts by mass (Composition 7 for Hard Coat Layer)
Organic fine particles (hydrophilization-treated acryl-styrene copolymer particles, average particle diameter of 3.5 μm, refractive index of 1.55, manufactured by Sekisui Plastics Co., Ltd.): 8 parts by mass
Pentaerythritol triacrylate (PETA) (product name: PETIA, manufactured by Daicel-Cytec Company, Ltd.): 80 parts by mass
Isocyanuric acid EO-modified triacrylate (product name: M-315, manufactured by Toagosei Co., Ltd.): 20 parts by mass
Polymerization initiator (IRGACURE 184, manufactured by BASF Japan Ltd.): 5 parts by mass
Polyether-modified silicone (TSF4460, manufactured by Momentive Performance Materials Inc.): 0.025 part by mass
Toluene: 120 parts by mass
Cyclohexanone: 30 parts by mass <Preparation of Composition for Low Refractive Index Layer>

Each constituent was blended to obtain a composition for a low refractive index layer to have the following composition:
(Composition for Low Refractive Index Layer)
- Hollow silica fine particles (solid content of hollow silica fine particle: 20 mass %, solution: methyl isobutyl ketone, average particle diameter: 50 nm): 40 parts by mass
- Pentaerythritol triacrylate (PETA) (product name: PETIA, manufactured by Daicel-Cytec Company, Ltd.): 10 parts by mass
- Polymerization initiator (IRGACURE 127, manufactured by BASF Japan Ltd.): 0.35 part by mass
- Modified silicone oil (X22164E; manufactured by Shin-Etsu Chemical Co., Ltd.): 0.5 part by mass
- Methyl isobutyl ketone (MIBK): 320 parts by mass
- Propylene glycol monomethyl ether acetate (PGMEA): 161 parts by mass Example 1

A triacetylcellulose resin film (TD60UL, manufactured by Fujifilm Corporation) with a thickness of 60 μm as a light transmissive substrate was prepared and the composition 1 for a hard coat layer was applied to one surface of the triacetylcellulose resin film to form a coating film. Then, a solvent in the coating film was evaporated by circulating dry air at 70° C. to the formed coating film at a flow rate of 0.2 m/s for 15 seconds and thereafter further circulating dry air at 70° C. at a flow rate of 10 m/s for 30 seconds to dry the coating film, and a hard coat layer of 4 μm in thickness (when cured) was formed to produce an optical film according to Example 1 by irradiating the coating film with ultraviolet light under nitrogen atmosphere (oxygen concentration of 200 ppm or less) so that the integrated amount of light is 100 mJ/cm$^2$ to cure the coating film Example 2

In Example 2, an optical film was produced in the same manner as in Example 1 except that the composition 2 for a hard coat layer was used instead of the composition 1 for a hard coat layer.

Example 3

In Example 3, a hard coat layer was formed on a triacetylcellulose resin film in the same manner as in Example 1 except that the integrated amount of ultraviolet light was 50 mJ/cm$^2$. Then, a composition for a low refractive index layer was applied to a surface of the hard coat layer so as to have a film thickness of 0.1 μm after dried (40° C.×1 min) and was cured by ultraviolet irradiation at the integrated amount of light of 100 mJ/cm$^2$ under nitrogen atmosphere (oxygen concentration of 200 ppm or less) to form a low refractive index layer to produce an optical film according to Example 3.

Example 4

In Example 4, an optical film was produced in the same manner as in Example 3 except that the composition 2 for a hard coat layer was used instead of the composition 1 for a hard coat layer.

Example 5

In Example 5, an optical film was produced in the same manner as in Example 1 except that the composition 3 for a hard coat layer was used instead of the composition 1 for a hard coat layer.

Comparative Example 1

In Comparative Example 1, an optical film was produced in the same manner as in Example 1 except that the composition 4 for a hard coat layer was used instead of the composition 1 for a hard coat layer.

Comparative Example 2

In Comparative Example 2, an optical film was produced in the same manner as in Example 3 except that the composition 5 for a hard coat layer was used instead of the composition 1 for a hard coat layer.

Comparative Example 3

In Comparative Example 3, an optical film was produced in the same manner as in Example 1 except that the composition 6 for a hard coat layer was used instead of the composition 1 for a hard coat layer.

Comparative Example 4

In Comparative Example 4, an optical film was produced in the same manner as in Example 1 except that the composition 7 for a hard coat layer was used instead of the composition 1 for a hard coat layer and the film thickness of a cured hard coat layer was 5 μm.

<Measurement of Surface Angle and Root Mean Square Slope RΔq>

A glass plate was affixed through a transparent pressure sensitive adhesive to the surface opposite to the other surface, on which the hard coat layer is formed, of each optical film obtained in Examples and Comparative Examples, to make a sample, and the surface geometry of the optical film was measured and analyzed using a white light interference microscope (New View 6300, manufactured by Zygo Corporation) under the following conditions. As analysis software, Microscope Application of MetroPro ver 8.3.2 was used
[Measurement Conditions]
Objective lens: 2.5 times
Zoom: 2 times
Number of data points: 992×992 points
Resolution (spacing per point): 2.2 μm
[Analysis Conditions]
Removed: None
Filter: High Pass
Filter Type Gauss Spline
Low wavelength: 300 μm A concavo-convex geometry in which waviness components are removed by a high-pass filter with a cutoff value of 300 μm is obtained on the above-mentioned conditions.
Remove spikes: on
Spike Height (xRMS): 2.5

Spike-like noises can be removed on the above-mentioned conditions.

Then, a SlopeX MAP image (display of slope in x direction) was displayed to display rms with the above-described analysis software (MetroPro ver 8.3.2—Microscope Application). This rms corresponds to a root mean square slope RΔq.

A slope Δi at each point was determined over the whole surface, the slope Δi was converted into a surface angle $θ_i$ from the above-described expression (3), and the percentage of a region in which the absolute value of the surface angle $θ_i$ was 0.05° or more was thus calculated.

<Interference Fringe Observation Evaluation>

A black acrylic sheet for preventing back surface reflection was affixed through a transparent pressure sensitive adhesive to the surface opposite to the other surface, on which the hard coat layer was formed, of the triacetylcellulose resin film of each optical film obtained in Examples and Comparative Examples, each optical film was irradiated with light from a hard coat layer or low refractive index layer side, and visual observation was carried out. An interference fringe inspection lamp (sodium lamp) manufactured by Funatech Co., Ltd. was used as a light source. Generation of interference fringes was evaluated based on the following criteria:

Excellent: No interference fringe was confirmed.
Good: A few interference fringes were confirmed but were at a level without any problem.
Poor: Interference fringes were confirmed clearly.

<Cloudiness Observation Evaluation>

A black acrylic sheet was affixed through a transparent pressure sensitive adhesive to the surface opposite to the other surface, on which the hard coat layer was formed, of the triacetylcellulose resin film of each optical film obtained in Examples and Comparative Examples, and cloudiness was observed under a table lamp (three-wavelength fluorescent lamp) in a dark room and evaluated based on the following criteria:

Good: No whiteness was observed.
Poor: Whiteness was observed.

The results are listed in Table 1 below.

TABLE 1

| | Composition for Hard Coat Layer | Low Refractive Index Layer | Rate (%) of Region with Surface Angle of 0.05° or More | RΔq | Interference Fringes | Cloudiness |
|---|---|---|---|---|---|---|
| Example 1 | 1 | Absent | 60.3 | 0.0024 | Excellent | Good |
| Example 2 | 2 | Absent | 65.5 | 0.0026 | Excellent | Good |
| Example 3 | 1 | Present | 59.0 | 0.0018 | Excellent | Good |
| Example 4 | 2 | Present | 63.2 | 0.0020 | Excellent | Good |
| Example 5 | 3 | Absent | 54.3 | 0.0020 | Good | Good |
| Comparative Example 1 | 4 | Absent | 1.2 | 0.0003 | Poor | Good |
| Comparative Example 2 | 5 | Present | 72.3 | 0.0035 | Excellent | Poor |
| Comparative Example 3 | 6 | Absent | 81.0 | 0.0085 | Excellent | Poor |
| Comparative Example 4 | 7 | Absent | 93.9 | 0.0188 | Excellent | Poor |

As indicated in Table 1, in Comparative Examples 1 to 4, interference fringes were confirmed and cloudiness was observed since neither requirement that the percentage of a region with a surface angle of 0.05° or more in the surface of the optical film is 50% or more nor requirement that the root mean square slope RΔq of a roughness curve on the surface of the optical film is 0.003 or less is satisfied. In contrast, in Examples 1 to 5, no interference fringe was confirmed or a few interference fringes were confirmed but were at a level without any problem and no cloudiness was observed since both requirements that the percentage of a region with a surface angle of 0.05° or more in the surface of the optical film is 50% or more and that the root mean square slope RΔq of a roughness curve on the surface of the optical film is 0.003 or less are satisfied.

EXPLANATION OF REFERENCE NUMERALS

10: Optical film
11: Light transmissive substrate
11A: Mixture region
12: Functional layer
12A: Concavo-convex Surface
20: Polarizing plate
21: Polarizing element
30: Liquid crystal panel
40: Image display apparatuses
50: Optical film
51: Light transmissive substrate
51A: Mixture region
52: Functional layer
52A: Concavo-convex Surface
53: Hard coat layer
54: Low refractive index layer

What is claimed is:

1. An optical film comprising;
a light transmissive substrate; and
a functional layer disposed on the light transmissive substrate;
wherein the functional layer has a concavo-convex surface forming a surface of the optical film;
wherein, assuming that a slope angle of the concavo-convex surface with respect to a film plane of the optical film in a cross section along a direction normal to the film plane is a surface angle, a percentage of a region in which the surface angle is 0.05° or more is 50% or more in the concavo-convex surface; and
wherein a root mean square slope RΔq of a roughness curve on the concavo-convex surface is 0.0024 or less.

2. The optical film according to claim 1, wherein
the functional layer comprises a hard coat layer; and
a surface of the hard coat layer is the concavo-convex surface.

3. The optical film according to claim 1, wherein
the functional layer comprises a hard coat layer; and a low refractive index layer disposed on the hard coat layer and having a refractive index that is lower than that of the hard coat layer; and a surface of the low refractive index layer is the concavo-convex surface.

4. The optical film according to claim 2, wherein the hard coat layer comprises a fine particle and a binder resin.

5. The optical film according to claim 3, wherein the hard coat layer comprises a fine particle and a binder resin.

6. The optical film according to claim 4, wherein the fine particle is an inorganic oxide fine particle.

7. The optical film according to claim 5, wherein the fine particle is an inorganic oxide fine particle.

8. The optical film according to claim 6, wherein the inorganic oxide fine particle is an inorganic oxide fine particle with a surface subjected to hydrophobization treatment.

9. The optical film according to claim 7, wherein the inorganic oxide fine particle is an inorganic oxide fine particle with a surface subjected to hydrophobization treatment.

10. The optical film according to claim 6, wherein
the inorganic oxide fine particle forms an aggregate in the hard coat layer; and
the aggregate has an average particle diameter of 100 nm or more and 2.0 µm or less.

11. The optical film according to claim 7, wherein
the inorganic oxide fine particle forms an aggregate in the hard coat layer; and
the aggregate has an average particle diameter of 100 nm or more and 2.0 µm or less.

12. A polarizing plate comprising:
the optical film according to claim 1; and
a polarizing element formed on a surface of the light transmissive substrate of the optical film, the surface being opposite to the other surface thereof on which the functional layer is formed.

13. A liquid-crystal display panel comprising the optical film according to claim 1.

14. An image display apparatus comprising the optical film according to claim 1.

\* \* \* \* \*